(12) United States Patent
Yamada et al.

(10) Patent No.: US 10,423,370 B2
(45) Date of Patent: Sep. 24, 2019

(54) PRINT DATA GENERATING DEVICE, PRINT DATA GENERATING SYSTEM, PRINT DATA GENERATING METHOD, AND PROGRAM FOR IDENTIFYING ERRORS IN GENERATING PRINT DATA

(71) Applicant: Seiko Epson Corporation, Tokyo (JP)

(72) Inventors: Yusuke Yamada, Matsumoto (JP); Katsuhiko Sugiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/005,653

(22) Filed: Jan. 25, 2016

(65) Prior Publication Data
US 2016/0239242 A1  Aug. 18, 2016

(30) Foreign Application Priority Data
Feb. 13, 2015  (JP) .................... 2015-026036

(51) Int. Cl.
G06F 3/12   (2006.01)
G06K 15/02  (2006.01)

(52) U.S. Cl.
CPC ............ *G06F 3/121* (2013.01); *G06F 3/1207* (2013.01); *G06F 3/1234* (2013.01); *G06F 3/1287* (2013.01); *G06F 3/1289* (2013.01); G06K 15/024 (2013.01)

(58) Field of Classification Search
CPC ...... G06F 3/121; G06F 3/1234; G06F 3/1207; G06F 3/1289
See application file for complete search history.

(56) References Cited

U.S. PATENT DOCUMENTS

| 7,920,283 | B2* | 4/2011 | Shimazaki | ........... G06K 15/007 358/1.15 |
|---|---|---|---|---|
| 2003/0053810 | A1* | 3/2003 | Jackelen | .............. G06K 15/005 399/16 |
| 2004/0046986 | A1* | 3/2004 | Kuwabara | ............. G06F 3/1207 358/1.14 |
| 2008/0231898 | A1 | 9/2008 | Iwanaga et al. | |
| 2010/0026738 | A1* | 2/2010 | Saikawa | ................ B41J 3/4075 347/1 |

(Continued)

FOREIGN PATENT DOCUMENTS

| JP | 05-270111 A | 10/1993 |
|---|---|---|
| JP | 10-269045 A | 10/1998 |

(Continued)

*Primary Examiner* — Benjamin O Dulaney
(74) *Attorney, Agent, or Firm* — Workman Nydegger

(57) ABSTRACT

To appropriately report that print data based on image data cannot be generated normally, a print data generating device has a server control unit including an image data generator and a print data generating unit. The image data generator acquires print requests, and generates and outputs image data based on the acquired print request. The print data generating unit acquires the image data output by the image data generating unit, generates and outputs print data based on the image data if print data can be generated normally based on the acquired image data, and if print data based on the acquired image data cannot be generated normally for a specific reason, generates and outputs print instructions data instructing printing information indicating the specific reason.

13 Claims, 8 Drawing Sheets

(56) References Cited

U.S. PATENT DOCUMENTS

| | | | |
|---|---|---|---|
| 2012/0008160 A1 | 1/2012 | Matsushita | |
| 2012/0081744 A1* | 4/2012 | Kadota | G06F 3/1211 |
| | | | 358/1.15 |
| 2012/0268781 A1* | 10/2012 | Kajihara | B41J 3/4075 |
| | | | 358/1.15 |
| 2012/0327436 A1 | 12/2012 | Orikasa | |
| 2013/0016377 A1* | 1/2013 | Meiyappan | G06F 3/121 |
| | | | 358/1.9 |
| 2015/0153977 A1* | 6/2015 | Tanaka | G06F 3/1229 |
| | | | 358/1.14 |

FOREIGN PATENT DOCUMENTS

| | | |
|---|---|---|
| JP | 2002-108583 A | 4/2002 |
| JP | 2007-038588 A | 2/2007 |
| JP | 2007-199779 A | 8/2007 |
| JP | 2008-234481 A | 10/2008 |
| JP | 2010-218457 A | 9/2010 |
| JP | 2013-132038 A | 7/2013 |

\* cited by examiner

ERROR OCCURRED.
LABEL CANNOT BE PRINTED.

FIG. 8A

PROBLEM WITH REGISTRY CONTENT ON SERVER.
LABEL CANNOT BE PRINTED.

FIG. 8B

PRINT DATA GENERATING DEVICE, PRINT DATA GENERATING SYSTEM, PRINT DATA GENERATING METHOD, AND PROGRAM FOR IDENTIFYING ERRORS IN GENERATING PRINT DATA

BACKGROUND

1. Technical Field

The present invention relates to a print data generating device, a print data generating system, a print data generating method, and a program.

2. Related Art

Print data generating devices (server devices) that process images in response to requests from client devices are known from the literature. See, for example, JP-A-H10-269045.

A print data generating device that processes images as described in JP-A-H10-269045 receives a print request, generates image data based on the print request, and generates print data based on the resulting image data. There are many reasons why generating print data based on the image data correctly may not be possible, and a problem with the print data generating device described in JP-A-H10-269045 is that it cannot accurately report the problem when this happens.

SUMMARY

The invention enables accurately reporting the problem when print data based on image data cannot be generated normally.

A print data generating device according to the invention has a controller (a control unit) including an image data generator (an image data generating unit) and a print data generator (a print data generating unit). The image data generating unit is configured to acquire a print request, and generate and output image data based on the acquired print request. The print data generating unit is configured to acquire the image data output by the image data generating unit, generate and output print data based on the image data if print data can be generated normally based on the acquired image data, and if print data based on the acquired image data cannot be generated normally for a specific reason, generate and output print instructions data instructing printing information indicating the specific reason.

When print data cannot be generated correctly based on image data, this configuration can appropriately report that print data cannot be generated.

In a print data generating device according to another aspect of the invention, the image data generating unit outputs processing device information including information related to the specifications or settings of the processing device corresponding to the generated image data together with the image data. The print data generating unit manages the specifications or settings of the printer that is the processing device that prints based on the print data when the print data is generated. When the image data output by the image data generating unit and the processing device information are acquired, and print data based on the acquired image data cannot be normally generated because the specifications or settings specified by the processing device information do not match the specifications or settings of the managed printer, the print data generating unit generates and outputs print instructions data instructing printing information indicating the cause.

This configuration can appropriately report when print data cannot be generated normally because the specifications or settings of the processing device corresponding to the image data do not match the specifications or settings of the processing device that actually prints.

In a print data generating device according to another aspect of the invention, when print data based on the acquired image data cannot be normally generated because an error occurred during the process of generating print data based on the image data, the print data generating unit generates and outputs print instructions data instructing printing information indicating the cause.

This configuration can appropriately report when print data cannot be generated normally because an error occurred during the process of generating print data based on the image data.

In a print data generating device according to another aspect of the invention, the image data generating unit generates and outputs the image data for one of the plural images based on the print request when a print request requesting printing plural images continuously is acquired. The print data generating unit reports to the image data generating unit after generating the print data that the print data was generated when print data based on the image data corresponding to the acquired one image can be generated normally, and reports to the image data generating unit that print data cannot be generated when the print data cannot be generated. The image data generating unit generates and outputs the image data for the next image after the one image when a report that the print data can be generated normally is received, and does not generate the image data for the next image after the one image when a report that the print data cannot be generated normally is received.

This configuration can improve processing efficiency and suppress wasteful use of recording medium.

Another aspect of the invention is a print data generating system including a terminal that sends a print request; and a print data generating device having a control unit configured with an image data generating unit and a print data generating unit. The image data generating unit is configured to acquire the print request send by the terminal, and generate and output image data based on the acquired print request. The print data generating unit is configured to acquire the image data output by the image data generating unit, generate and output print data based on the image data if print data can be generated normally based on the acquired image data, and if print data based on the acquired image data cannot be generated normally for a specific reason, generate and output print instructions data instructing printing information indicating the specific reason.

When print data cannot be generated correctly based on image data, this configuration can appropriately report that print data cannot be generated.

Another aspect of the invention is a print data generating method, including: acquiring a print request; generating and outputting image data based on the acquired print request; generating and outputting print data based on the image data if print data can be generated normally based on the acquired image data; and if print data based on the acquired image data cannot be generated normally for a specific reason, generating and outputting print instructions data instructing printing information indicating the specific reason.

When print data cannot be generated correctly based on image data, this configuration can appropriately report that print data cannot be generated.

Another aspect of the invention is a program that can be executed by a control unit that controls a print data generating device, the program causing the control unit to function as an image data generating unit and a print data generating unit. The image data generating unit is configured to acquire a print request, and generate and output image data based on the acquired print request. The print data generating unit is configured to acquire the image data output by the image data generating unit, generate and output print data based on the image data if print data can be generated normally based on the acquired image data, and if print data based on the acquired image data cannot be generated normally for a specific reason, generate and output print instructions data instructing printing information indicating the specific reason.

When print data cannot be generated correctly based on image data, this configuration can appropriately report that print data cannot be generated.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 8A and 8B show examples of images based on print instructions data.

DESCRIPTION OF EMBODIMENTS

A preferred embodiment of the present invention is described below with reference to the accompanying figures.

Figure 1:
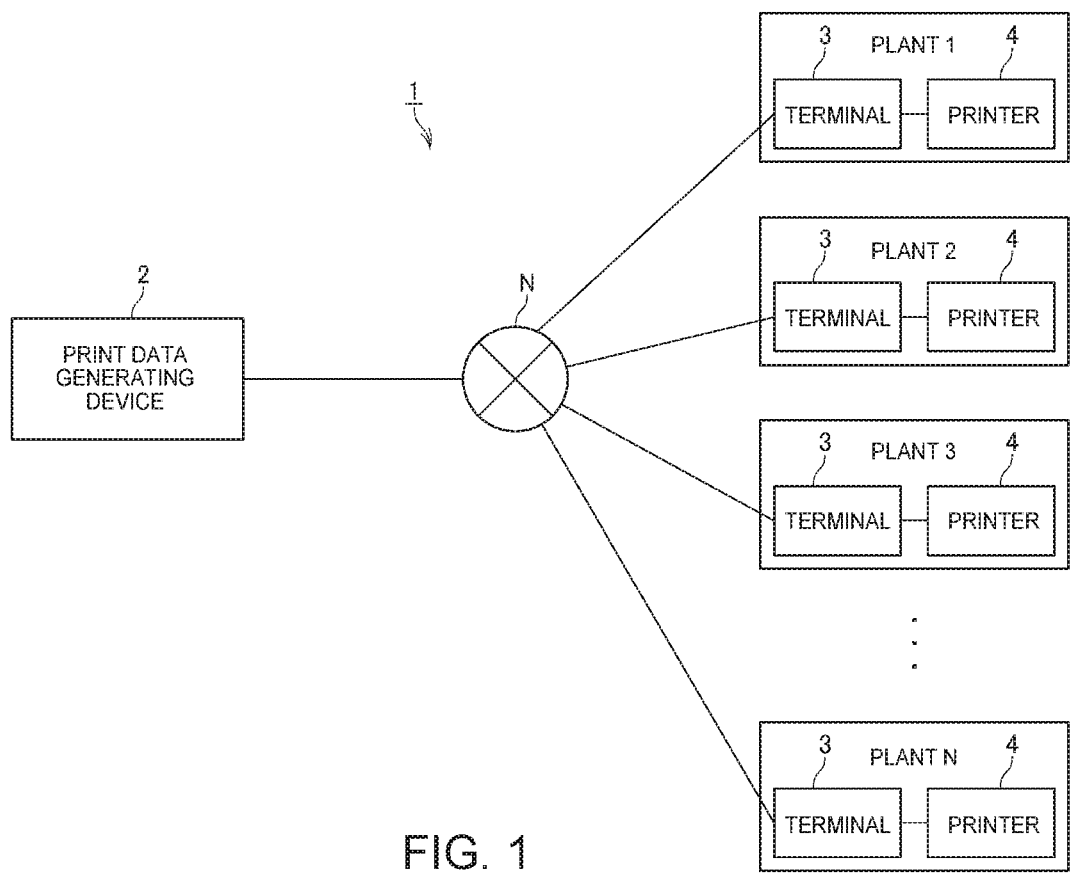
FIG. 1 illustrates a print data generating system according to the invention.

FIG. 1 illustrates a print data generating system 1 according to the invention. The print data generating system 1 is a system for producing labels that are affixed to a specific model of a specific product (referred to below as simply the product). The product in this example is a printer, projector, television, or other electrical product.

A serial number image G31 (FIG. 3B) expressing a serial number as information uniquely identifying an individual product, and a barcode image G32 (FIG. 3B) expressing the serial number as a barcode, is printed on each label produced by the print data generating system 1.

As shown in FIG. 1, there are multiple factories, identified herein as plant 1 to plant n, that produce the products. The factories may be in the same country or in different countries.

The labels applied to the products produced in any factory are printed in the same factory. Duplication of the serial numbers printed on labels produced in different factories is therefore necessary.

As shown in FIG. 1, the print data generating system 1 has a print data generating device 2.

The print data generating device 2 is connected to a network N including the Internet. The print data generating device 2 is a server of which the terminal 3 described below is a client. In FIG. 1, the print data generating device 2 is represented by a single block, but this does not mean that the print data generating device 2 necessarily comprises a single server device. For example, the print data generating device 2 may comprise plural server devices. More specifically, the print data generating device 2 may be configured as desired as long as it can run the processes described below.

As shown in FIG. 1, a terminal 3 is located in each factory. The terminal 3 is connected to the network N, and communicates with the print data generating device 2 through the network N. Functions of the terminal 3, and processes based on those functions, are described below.

A printer 4 is connected to the terminal 3 in each factory. The printer 4 has a print function for printing images on recording media, and produces labels by the method described below.

Figure 2:
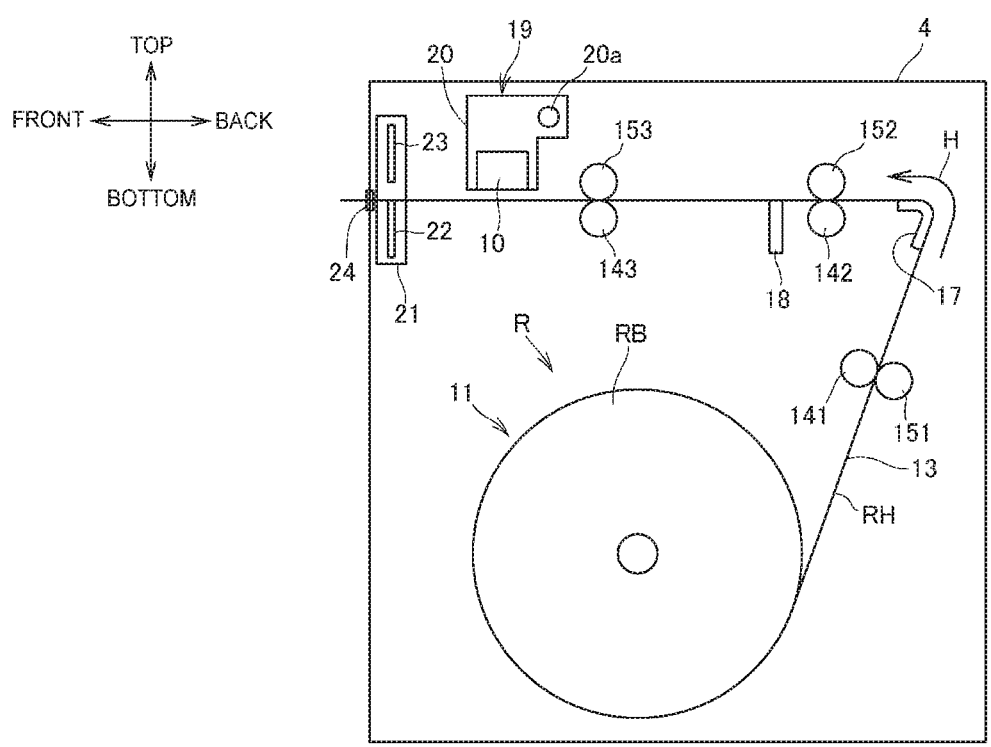
FIG. 2 illustrates the configuration of a printing device.

FIG. 2 illustrates the configuration of main parts of a printer 4 according to this embodiment.

As indicated by the arrows in FIG. 2, the left side in the figure is referred to below as the front, the right side as the back, the top as the top, and the bottom as the bottom of the printer 4.

The printer 4 is a serial inkjet printer. The printer 4 stores a roll of paper R (recording media), and conveys paper from the paper roll R in the conveyance direction H. The printer 4 print s on the conveyed roll paper R by ejecting ink from a serial printhead 10, which in this embodiment is a serial inkjet head.

Figure 3A:
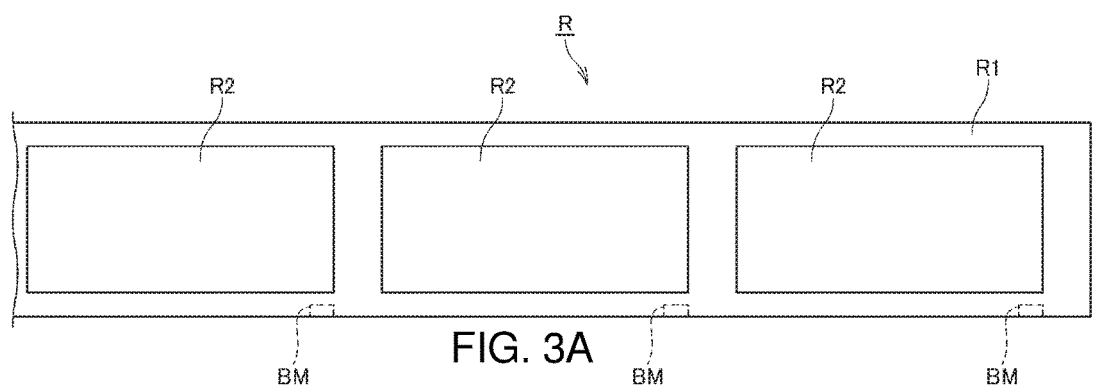
FIGS. 3A and 3B show examples of roll paper and label images.

FIG. 3A shows an example of the roll paper R stored in the printer 4.

The roll paper R shown in FIG. 3A is label paper having multiple labels R2 affixed with space therebetween to a continuous web liner R1. The labels R2 are adhesive, and can be peeled from the liner R1 along the edges of the label R2. The length of the long side of each label R2 is the same. The gap between adjacent labels R2 is also the same.

The area of each label R2 on the roll paper R is the area where images can be printed (the area where dots can be formed by the serial printhead 10). The printer 4 forms dots on the label R2, and prints images by a combination of dots.

As shown in FIG. 3A, a black mark BM, which is a black colored mark, is formed on the back side of the roll paper R at a position corresponding to each label R2.

A label image G1 (described below) is printed on each label R2, and the label R2 is then peeled from the liner R1 and applied to the product as the label.

Figure 3B:
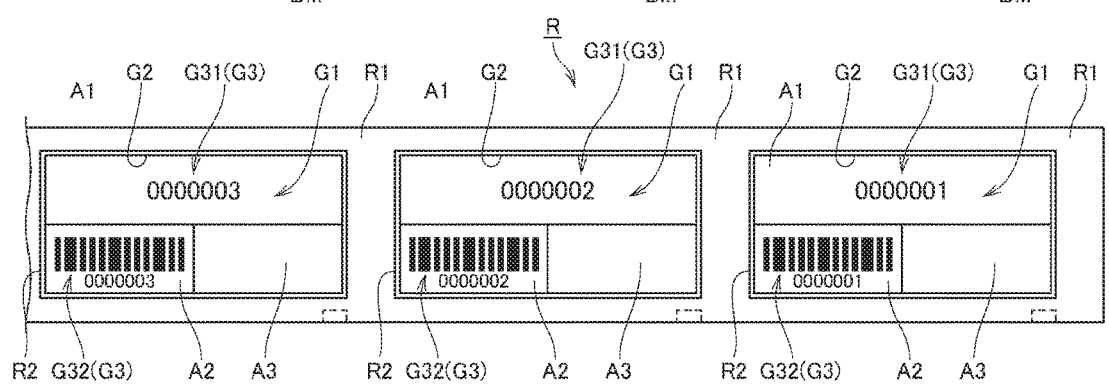

FIG. 3B illustrates the roll paper R after a label image G1 is printed on each label R2 of the roll paper R.

As shown in FIG. 3B, the label image G1 includes a static image G2 forming border of a specific shape, and a variable image G3 including the serial number image G31 expressing the serial number in human-readable text, and the barcode image G32 expressing the serial number with a barcode.

The static image G2 is an image whose shape does not change in the plural label images G1 printed continuously on the plural labels R2.

The variable image G3 is an image that may change shape in the plural label images G1 printed continuously on the plural labels R2. Because the serial number on each label is different on each label in this embodiment, the shape of the variable image G3 changes in each continuously printed label image G1.

As shown in FIG. 3B, the frame formed by the static image G2 divides the area of the label R2 into three areas, area A1, area A2, and area A3. The serial number image G31 is printed in area A1, and the barcode image G32 is printed in area A2.

As shown in FIG. 2, the printer 4 has a roll paper compartment 11 that holds the roll paper R. The roll-shaped portion of the roll paper R stored in the roll paper compartment 11 is referred to below as the paper roll RB. The portion of the roll paper R that is conveyed from the paper roll RB stored in the roll paper compartment 11 is referred to below as the conveyed roll paper RH.

As shown in FIG. 2, the printer 4 has a conveyance path 13, which is the path through which the conveyed roll paper RH is conveyed. The conveyed roll paper RH delivered from the paper roll RB is conveyed in the conveyance direction H through the conveyance path 13.

As shown in FIG. 2, three conveyance rollers 141, 142, 143 are disposed to the conveyance path 13 in order from the upstream end to the downstream end in the conveyance direction H. Opposite each of the conveyance rollers 141, 142, 143 is a driven roller 151, 152, 153 that rotates following the rotation of the matching conveyance roller 141, 142, 143. The conveyed roll paper RH is held between the conveyance rollers 141, 142, 143 and the driven rollers 151, 152, 153, and is conveyed in the conveyance direction H according to rotation of the conveyance rollers 141, 142, 143. The conveyance rollers 141, 142, 143 are connected to a conveyance motor through a power transfer mechanism, and rotate as driven by the conveyance motor.

As shown in FIG. 2, a paper guide 17 is disposed between the conveyance roller 141 located at the most upstream end in the conveyance direction H, and the conveyance roller 142 next downstream from the conveyance roller 141. The paper guide 17 contacts the back side of the conveyed roll paper RH, and causes the conveyed roll paper RH to curve toward the front as it is conveyed up in the downstream direction. By contacting and causing the conveyed roll paper RH to bend, the paper guide 17 applies tension to the conveyed roll paper RH, and suppresses the development of slack in the conveyed roll paper RH.

A black mark sensor 18 downstream in the conveyance direction H from the conveyance roller 142. The black mark sensor 18 is a sensor that detects the black marks BM formed on the back side of the roll paper R. The printer control unit 30 (FIG. 3A) detects based on the output from the black mark sensor 18 if a black mark BM is at the sensor position.

Conveyance roller 143 is located downstream in the conveyance direction H from the black mark sensor 18, and a print unit 19 is downstream from the conveyance roller 143.

The print unit 19 includes a carriage 20, and the serial printhead 10 carried by the carriage 20.

The carriage 20 is supported on a carriage rail 20a extending in the scanning direction Y crosswise to the conveyance direction H, and carries the serial printhead 10 in the scanning direction Y along the carriage rail 20a.

The serial printhead 10 is an inkjet head, and has nozzles for plural colors of ink (four colors, CMYK, in this example). The serial printhead 10 receives ink from an ink cartridge not shown, ejects ink from nozzles disposed in rows, and forms dots on the conveyed roll paper RH to print images.

A cutter unit 21 is disposed downstream in the conveyance direction H from the print unit 19. The cutter unit 21 has a fixed knife 22 and a movable knife 23 that moves against the fixed knife 22 to cut. The cutter unit 21 moves the movable knife 23 to cut the conveyed roll paper RH.

The paper exit 24 is downstream in the conveyance direction H from the cutter unit 21. The conveyed roll paper RH is discharged through the paper exit 24 to the outside of the printer 4.

Figure 4:
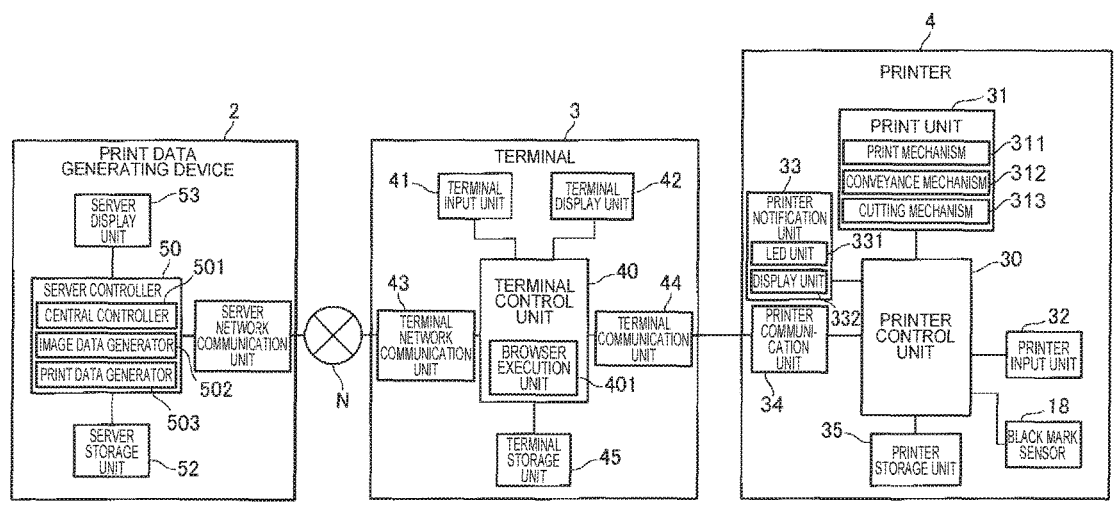
FIG. 4 is a block diagram illustrating the functional configuration of devices in the print data generating system.

FIG. 4 is a block diagram showing the functional configuration of devices in the print data generating system 1.

The printer 4 is a serial inkjet printer.

As shown in FIG. 4, the printer 4 has a printer control unit 30, print unit 31, printer input unit 32, printer notification unit 33, printer communication unit 34, and printer storage unit 35.

The printer control unit 30 includes a CPU, ROM, RAM, and other peripheral circuits, and controls the printer 4 by means of hardware and software processes, such as the CPU reading and running a control program.

The print unit 31 includes a print mechanism 311, conveyance mechanism 312, and cutting mechanism 313.

The print mechanism 311 includes the serial printhead 10, a head driver circuit that drives the serial printhead 10, the carriage 20, a carriage drive motor that causes the carriage 20 to move, and a motor drive circuit that drives the carriage drive motor. The print mechanism 311 forms dots and prints images on labels R2 as controlled by the printer control unit 30.

The conveyance mechanism 312 includes the conveyance rollers 141, 142, 143, the conveyance motor that turns the conveyance rollers, and a motor drive circuit that drives the conveyance motor. The conveyance mechanism 312 conveyance speed the roll paper R as controlled by the printer control unit 30.

The cutting mechanism 313 includes the cutter unit 21, a cutter drive motor that moves the movable knife 23 of the cutter unit 21, and a motor drive circuit that drives the cutter drive motor. The cutting mechanism 313 cuts the roll paper R as controlled by the printer control unit 30.

The printer input unit 32 has an operating switch on the case of the printer 4. The printer input unit 32 detects operation of the operating switch, and outputs a signal indicating the switch was operated to the printer control unit 30. The printer control unit 30 executes a process appropriate to the operation based on the input from the printer input unit 32.

The printer notification unit 33 has an LED unit 331 and a display unit 332.

The LED unit 331 has multiple LEDs. The LED unit 331 indicates printer 4 status information such as the operating mode and if an error has occurred by turning the multiple LEDs on or off as controlled by the printer control unit 30.

The display unit 332 has an LCD panel. The display unit 332 displays information on the display unit 332 as controlled by the printer control unit 30.

The printer communication unit 34 communicates with the terminal 3 as controlled by the printer control unit 30. The communication standard used for communication by the printer 4 and terminal 3 may be a serial communication standard such as USB or RS-232C, or a LAN standard. The terminal 3 and printer 4 may also connect by wire or wirelessly.

The printer storage unit 35 has memory and stores data.

As described above, the printer 4 has a black mark sensor 18. The black mark sensor 18 outputs a detection value to the printer control unit 30 at a specific interval. Based on input from the black mark sensor 18, the printer control unit 30 detects when a black mark BM is at the detection position of the black mark sensor 18, and manages the position of the roll paper R based thereon.

The terminal 3 is a computer that functions as a client in relation to the print data generating device 2, and functions as a host computer in relation to the printer 4.

As shown in FIG. 4, the terminal 3 has a terminal control unit 40, terminal input unit 41, terminal display unit 42, terminal network communication unit 43, terminal communication unit 44, and terminal storage unit 45.

The terminal control unit 40 has a CPU, ROM, RAM, and other peripheral circuits, and controls the terminal 3 by means of hardware and software processes, such as the CPU reading and running a control program.

A specific browser is installed on the terminal 3. The terminal control unit 40 functions as a browser execution unit 401 by reading and running the installed browser.

The terminal input unit 41 is connected to input devices such as a mouse and keyboard, is connected to input means such as the operating switches on the case of the terminal 3, detects input to the input means, and outputs to the terminal control unit 40. The terminal control unit 40 executes processes appropriate to the input means based on input from the terminal input unit 41.

The terminal display unit 42 has an LCD panel or other display panel, and displays images on the display panel as controlled by the terminal control unit 40.

The terminal network communication unit 43 communicates with the print data generating device 2 through the network N according to a specific communication protocol as controlled by the terminal control unit 40.

The terminal communication unit 44 communicates with the printer 4 according to a specific communication protocol as controlled by the terminal control unit 40.

The terminal storage unit 45 has memory and stores data.

The print data generating device 2 is a server of which the terminal 3 is a client.

As shown in FIG. 4, the print data generating device 2 has a server control unit 50 (controller), server network communication unit 51, server storage unit 52, and server display unit 53.

The server control unit 50 has a CPU, ROM, RAM, and other peripheral circuits, and controls the print data generating device 2 by means of hardware and software processes, such as the CPU reading and running a control program.

A basic control program controlling basic operation of the print data generating device 2 is installed on the print data generating device 2. Included in the basic control program is web server software that causes the print data generating device 2 to function as an HTTP server of which the terminal 3 is a client. By reading and running the basic control program, the server control unit 50 functions as a central control unit 501 and image data generator 502.

A function extension program, which is a plug-in that can be called from the basic control program, is installed on the print data generating device 2. By invoking this extension program, the server control unit 50 functions as a print data generating unit 503 (a print data generator).

The server network communication unit 51 communicates with the terminal 3 through the network according to a specific communication protocol as controlled by the server control unit 50.

The server storage unit 52 has memory and stores data.

The server display unit 53 has an LCD panel or other display panel, and displays images on the panel as controlled by the server control unit 50.

The operation of the print data generating device 2, terminal 3, and printer 4 when producing labels is described next.

Figure 5:
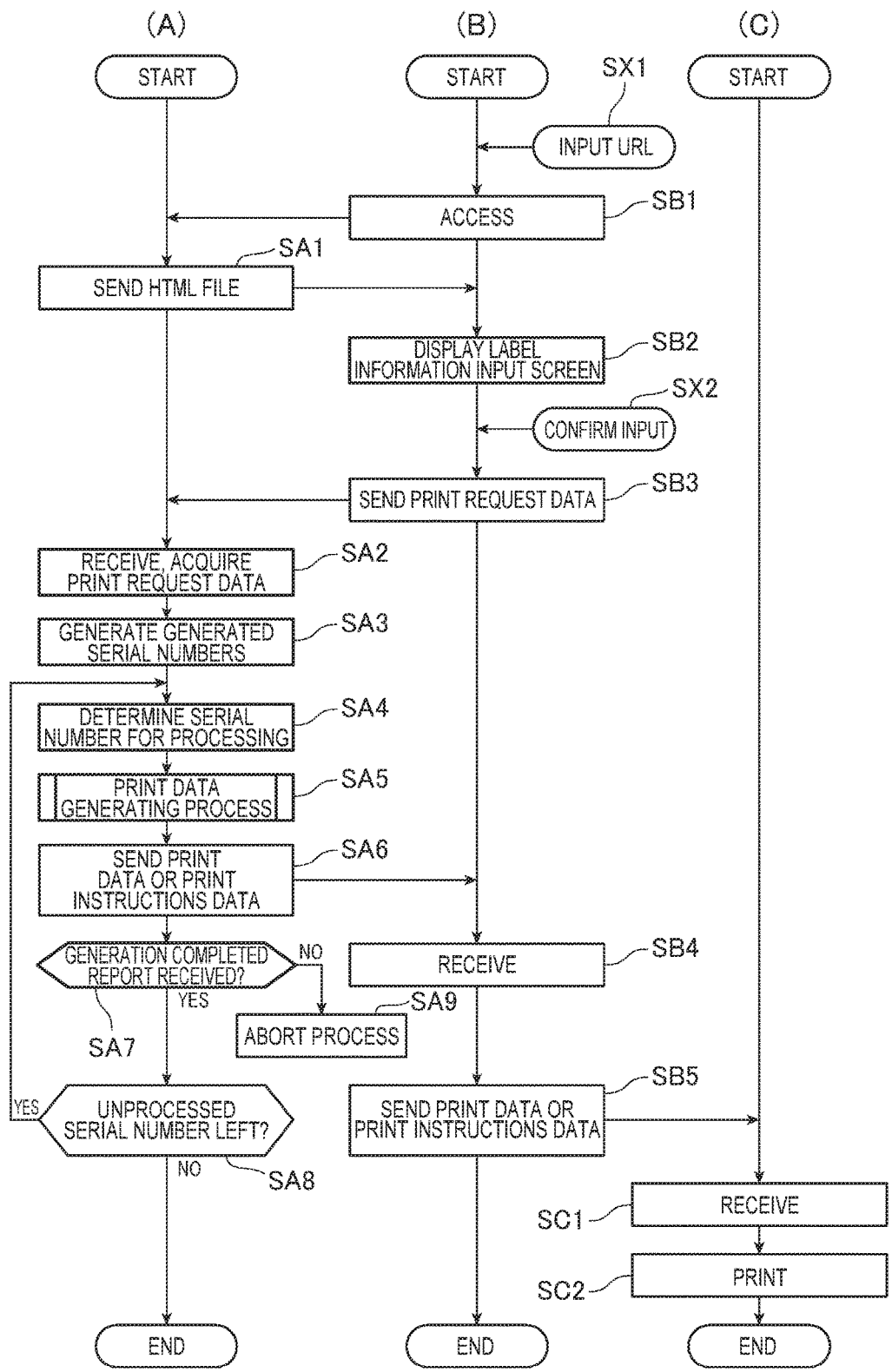
FIG. 5 is a flow chart of the operation of devices in the print data generating system.

FIG. 5 is a flow chart showing the operation of the print data generating device 2, terminal 3, and printer 4 when producing labels, column (A) of FIG. 5 showing the operation of the print data generating device 2, column (B) of FIG. 5 the operation of the terminal 3, and column (C) of FIG. 5 the operation of the printer 4.

To produce labels, an operator in the factory starts the browser on the terminal 3 and inputs a specific URL of the print data generating device 2 to the URL input field of a window displayed once the browser starts to access the specific URL (step SX1). The operator is previously informed of this specific URL.

As shown in column (B) of FIG. 5, the browser execution unit 401 of the terminal control unit 40 of the terminal 3 accesses the input specific URL through HTTP (step SB1).

As shown in column (A) of FIG. 5, in response to the terminal 3 accessing the specific URL, the central control unit 501 of the server control unit 50 of the print data generating device 2 generates and sends an HTML file for displaying a label information input screen RG to the terminal 3 (step SA1).

As shown in column (B) of FIG. 5, the browser execution unit 401 of the terminal control unit 40 of the terminal 3 displays the label information input screen RG in a window based on the HTML file received from the print data generating device 2 (step SB2).

Figure 6:
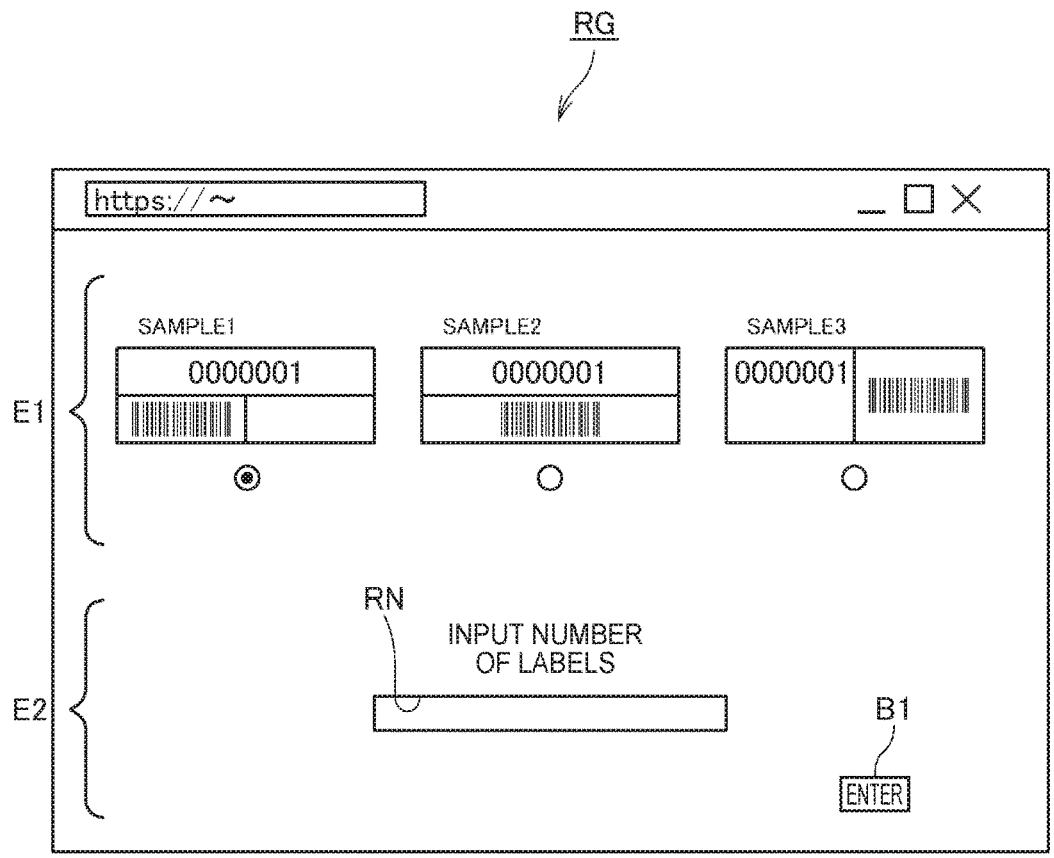
FIG. 6 shows an example of a label information input screen.

FIG. 6 shows an example of the label information input screen RG.

As shown in FIG. 6, a label selection area E1 and a print count input field E2 are provided in the label information input screen RG.

Plural samples (three in FIG. 6) of the label image G1 are shown in the label selection area E1. One of the sample label images G1 can be selected from the plural label images G1 by selecting the corresponding radio button.

The operator can therefore check the shape of the static image G2 (the type of frame), and the positioning of the serial number image G31 and barcode image G32 by simply looking at the sample label images G1 presented in the label selection area E1, and select the desired format of the label image G1 by selecting the corresponding radio button.

A label count input field RN for inputting the number of labels to print is provided in the print count input field E2.

The operator inputs the number of labels to print to the label count input field RN. Except for specific cases such as described below, the printer 4 continuously prints the label image G1 for the number of labels input to the label count input field RN to plural labels R2 on the roll paper R.

Below, the number of labels input to the label count input field RN is referred to as the "input label count."

After selecting the sample label image G1 and inputting the number of labels to the label count input field RN, the operator confirms the input by clicking the Enter button B1 (step SX2).

After the input is confirmed, the browser execution unit 401 sends print request data, including identification information (referred to below as "label image ID") for the selected sample label image G1 and the input label count, requesting producing labels (printing the label images G1) to the print data generating device 2 by a function of a script embedded in the HTML file (step SB3).

As shown in column (A) of FIG. 5, the central control unit 501 of the server control unit 50 of the print data generating device 2 receives the print request data and acquires the label image ID and input label count (step SA2). The process of step SA2 is equivalent to the process of acquiring a print request.

Next, the central control unit 501 produces the number of serial numbers equal to the input label count (step SA3).

More specifically, the central control unit 501 manages the serial numbers for the labels that were produced in the past. The central control unit 501 can therefore generate a serial number of a different value for the number of labels equal to the input label count according to a specific rule without duplicating the serial number of any label produced in the past. For example if the serial number is a five digit value, the serial numbers of the previously produced labels are 00000 to 00100, and the input label count is 100, in step SA3 the central control unit 501 generates 100 serial numbers with the values 00101, 00102, 00103 . . . 00199, 00200.

The serial numbers generated by the central control unit 501 in step SA3 are referred to below as the "generated serial numbers."

Next, following a specific order, the central control unit 501 sets one of the generated serial numbers as the serial number to be processed in the print data generating process of step SA5 described below (step SA4).

The generated serial number selected in step SA4 by the central control unit 501 for processing in the print data generating process is referred to below as the "target serial number."

The print data generating device 2 then executes the print data generating process (step SA5).

Figure 7:
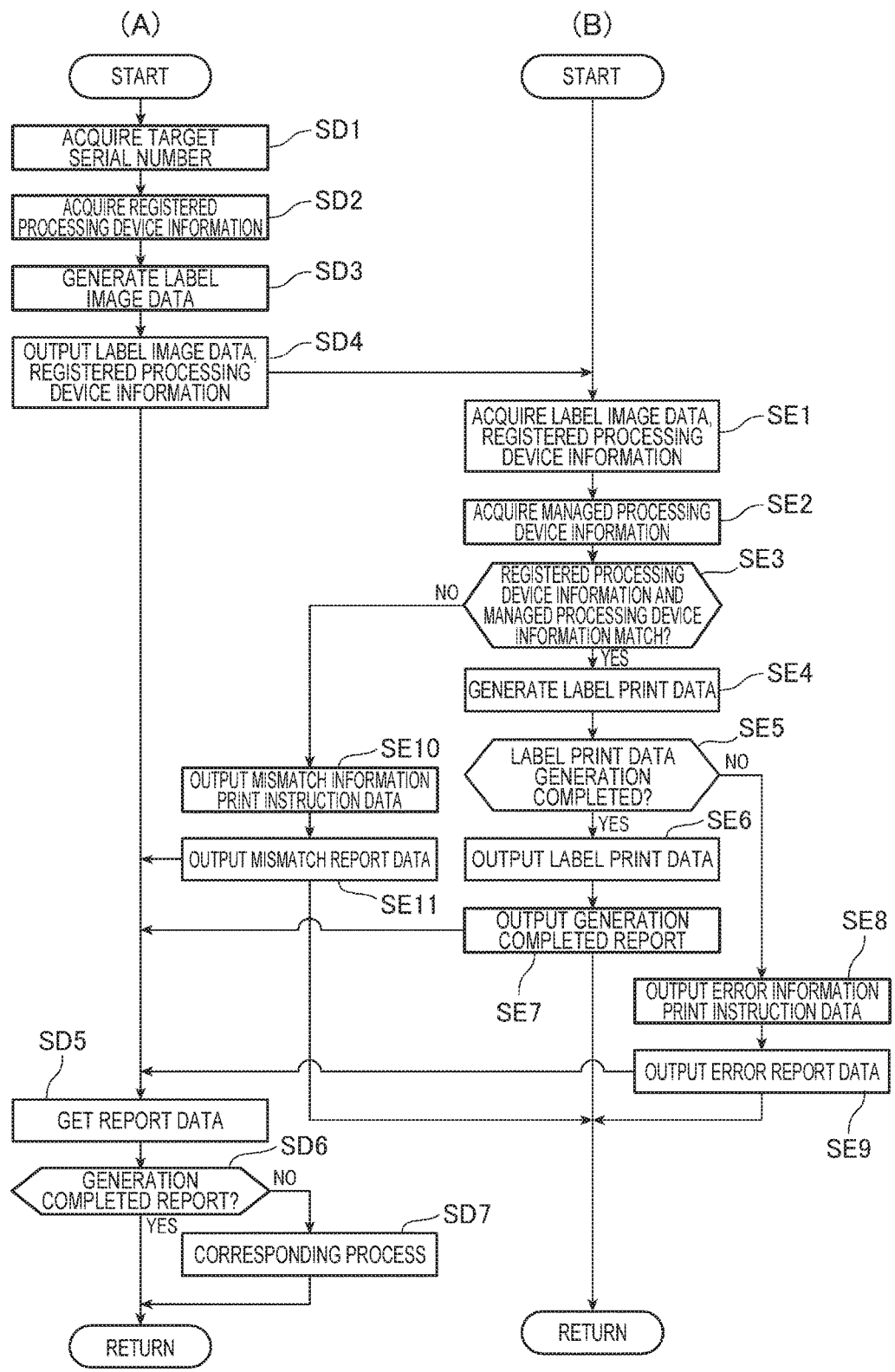
FIG. 7 is a flowchart of the operation of the print data generating device.

FIG. 7 is a flowchart of the operation of the print data generating device 2 when running the print data generating process, (A) showing the operation of the image data generator 502, and (B) showing the operation of the print data generating unit 503.

As shown in column (A) of FIG. 7, the image data generator 502 first acquires the target serial number (step SD1).

Next, the image data generator 502 acquires the registered processing device information (step SD2).

The registered processing device information includes information about the specifications of the processing device that can print images correctly, and information about the print settings, based on print data (described further below) that is generated based on the image data resulting from the image data generating process (described further below). Able to print correctly based on the print data means able to print an image of the intended size without the image going outside the borders of the label R2.

A processing device in this embodiment of the invention means a device in which roll paper R can be loaded and which can print label images G1 continuously to plural labels R2 of the loaded roll paper R. The printer 4 is one processing device.

The information indicating the specifications included in the registered processing device information includes information indicating the resolution and information indicating the printing method.

In the process described below, the image data generator 502 generates image data compatible with the resolution and the printing method indicated by the specifications information. A processing device compatible with the resolution and printing method indicated by the registered processing device information can therefore print images correctly based on the print data generated based on the image data generated by the image data generator 502.

Information identifying the type of roll paper R is included in the information indicating the settings contained in the registered processing device information.

There are many different types of roll paper R, and the width of the short dimension of the roll paper R, the size of the labels R2, and the interval between adjacent labels R2 may differ in each type of roll paper R. Information indicating the type of roll paper R is set as a configuration parameter in the processing device according to type of roll paper R that is loaded.

In the process described below, the image data generator 502 generates image data for the type of roll paper R indicated by the settings information. Therefore, a device in which roll paper R of the type indicated by the registered processing device information is loaded, and information indicating that type of roll paper R is set as a configuration parameter, can therefore correctly print images based on print data generated based on the image data generated by the image data generator 502.

The registered processing device information is previously registered and stored by a specific means in a specific storage area of the print data generating device 2 by the operator that manages the print data generating device 2.

After the registered processing device information is acquired in step SD2, the image data generator 502 generates image data (referred to below as the label image data) for a label image G1 using the target serial number based on the target serial number acquired in step SD1 and the registered processing device information acquired in step SD2 (step SD3).

Note that image data as used herein is data storing color information as the gradation value for a specific gradation for red (R), green (G), and blue (B) for each dot of the plural dots rendered in a dot matrix pattern.

In step SD3, the image data generator 502 generates the label image data as described below.

First, the image data generator 502 acquires the label image ID included in the print request data acquired in step SA2.

Next, the image data generator 502 acquires the image data (referred to below as the static image data) of the static image G2 for the label image ID. A database relationally storing label image ID and static image data is stored in the server storage unit 52, and the image data generator 502 acquires the static image data from the database using the label images as the search key. The static image data is image data corresponding to the type of roll paper R, printing method, and resolution indicated by the registered processing device information.

Next, the image data generator 502 renders the static image data in a specific buffer.

Next, the image data generator 502, based on the target serial number, generates the image data (referred to below as the serial number image data) of the serial number image G31. For example, image data for each character that could be included in the string expressing the serial number is previously stored, and the image data generator 502 generates the serial number image data based on the image data of the previously registered characters.

To generate the serial number image data, the image data generator 502 executes an image process as required appropriately to the type of roll paper R, printing method, and resolution indicated by the registered processing device information, and generates the serial number image data appropriately to the type of roll paper R, printing method, and resolution indicated by the registered processing device information.

Next, the image data generator 502 superimposes the generated serial number data on the static image data rendered in a buffer, and renders the composite image at an appropriate place in the buffer.

Next, the image data generator 502 generates image data (referred to below as barcode image data) for the barcode image G32 based on the target serial number. The basic control program includes a program with a function for generating image data for a barcode representing a specific number based on the specific number, and the image data generator 502 generates the barcode image data by a function of this program.

Next, the image data generator 502 superimposes the resulting barcode image data on the static image data rendered in the buffer, and renders the combined image at an appropriate place in the buffer.

This completes generating label image data by the image data generator 502.

After generating the label image data in step SD3, the image data generator 502 outputs the resulting label image data and registered processing device information to the print data generating unit 503 (step SD4).

As shown in column (B) of FIG. 7, the print data generating unit 503 acquires the label image data and registered processing device information output by the image data generator 502 (step SE1).

Next, the print data generating unit 503 acquires the managed processing device information (step SE2).

The managed processing device information includes information about the specifications (including information about the resolution and printing method) of the printer 4, that is, the processing device that actually prints the labels, and information about the print settings (including information about the type of roll paper R).

The managed processing device information may be defined by an extension function (plug-in) or stored in a specific storage area by a previous registration process, or the print data generating unit 503 may communicate with the terminal 3 to acquire the required information, and generate and store the managed processing device information in a specific storage area.

By storing the managed processing device information, the print data generating unit 503 manages the specifications or settings of the printer 4, which is the processing device that prints the labels.

Next, the print data generating unit 503 compares the registered processing device information acquired in step SE1, and the managed processing device information acquired in step SE2, and determines if they match (step SE3). More specifically, the print data generating unit 503 determines in step SE3 if the type of roll paper R, printing method, and resolution indicated by the registered processing device information, and the type of roll paper R, printing method, and resolution indicated by the managed processing device information, match. If the resolution, printing method, and type of roll paper R all match, the print data generating unit 503 determines the registered processing device information and the managed processing device information match. If any one of the resolution, printing method, and type of roll paper R does not match, the print data generating unit 503 determines the registered processing device information and the managed processing device information do not match.

Note that if the registered processing device information and the managed processing device information do not match, the printer 4 cannot print correctly based on the print data even if print data was generated based on the label image data acquired in step SE1.

The registered processing device information and the managed processing device information may not match in cases such as described below.

The print data generating system 1 according to this embodiment is a system that is configured by modifying an existing system.

In the existing system, the print data generating device 2 and the processing device are communicatively connected through a network. When the processing device prints an image in the existing system, the print data generating device 2 generates and sends image data by functions of the basic control program to the processing device. The processing device generates print data based on the image data received from the print data generating device 2, and prints an image based on the generated print data.

The printer 4 in the print data generating system 1, however, does not have a function for generating print data based on image data. As a result, the processing load on the printer 4 when printing an image can be reduced and efficiency improved, devices (such as the CPU and memory) with less processing capacity than in the conventional processing device can be used for the printer 4, and the manufacturing cost of the printer 4 is thereby reduced.

Because the printer 4 in this print data generating system 1 does not have a function for generating print data based on image data, an extension program, which is a plug-in of the basic control program, is installed on the print data generating device 2, and the ability to generate print data based on image data is added to the print data generating device 2 by a function of this program extension (plug-in).

By thus installing an extension program (plug-in) to add a function for generating print data based on image data to the print data generating device 2, the effect on the basic control program (such as programming changes to the basic control program) can be suppressed and the desired functionality can be added.

Furthermore, when the printer 4 settings are changed or the printer 4 is replaced with a printer 4 of different specifications, compatibility with changed settings or the replacement device can be maintained, and the effect on the basic control program by changed settings or device replacement can be suppressed, by programming changes to the installed extension program, or installing a new extension program with the desired function.

The registered processing device information and the managed processing device information may also not match in cases such as described below as a result of adding a function for generating print data based on image data by installing an extension program (plug-in).

That is, when installing an extension program, the operator responsible for managing the print data generating device 2 must change the content of the registered processing device information and perform other processes (such as converting the registered static image data to image data compatible with the specifications and settings of the printer 4) appropriately to the specifications and settings of the printer 4. There may also be a delay between when the extension program is installed and when the operator changes the content of the registered processing device information, or the content of the registered processing device information may not be changed due to insufficient operator knowledge. In such cases, the registered processing device information and the managed processing device information will not match.

As shown in column (B) of FIG. 7, if the registered processing device information acquired in step SE1 and the managed processing device information acquired in step SE2 are determined to match (step SE3: YES), the print data generating unit 503 generates print data based on the label image data (step SE4).

Below, the print data generated based on the label image data is referred to as "label print data.")

Note that the print data in this example is data storing the amount of ink ejected for each color of ink used in the printer 4 for each of the plural image dots rendered in a dot matrix pattern.

Based on the label image data, the print data generating unit 503 generates the label print data in step SE4 by an existing process using a lookup table.

During the process of generating the label print data based on the label image data, the print data generating unit 503 monitors if generating the label print data was completed normally. If the label print data was completed normally, the print data generating unit 503 goes to step SE6. If generating the label print data failed, the print data generating unit 503 goes to step SE8. Note that generating the label print data may fail when an error occurs, such as when the work area required to run the process cannot be acquired.

In step SE5, the print data generating unit 503 determines if generating the label print data in step SE4 ended normally.

If the process of generating label print data ended normally (step SE5: YES), the print data generating unit 503 outputs the resulting label print data to the central control unit 501 (step SE6).

Next, the print data generating unit 503 outputs to the image data generator 502 report data (referred to below as "generation completed report data") indicating that label print data was generated normally based on the label image data and generating the label print data is completed (step SE7). Next, the print data generating unit 503 ends the print data generating process.

However, if generating the label print data failed because an error occurred during the process of generating label print data based on the label image data, the print data generating unit 503 executes the following steps. The print data generating unit 503 generates error information print instruction data (print instruction data), which is print data instructing printing information indicating that the label print data cannot be correctly generated due to an error, and outputs to the central control unit 501 (step SE8).

The error information print instruction data is print data compatible with the specifications and settings of the printer 4.

When the printer 4 prints an image on a label R2 based on the error information print instruction data, information indicating that the label print data cannot be correctly generated due to an error is printed on a label R2 as shown in FIG. 8A.

Next, the print data generating unit 503 outputs report data (error report data) indicating that the label print data could not be normally generated due to an error to the image data generator 502 (step SE9). The print data generating unit 503 then ends the print data generating process.

However, if step SE3 determines that the registered processing device information acquired in step SE1, and the managed processing device information acquired in step SE2, do not match, the print data generating unit 503 generates and outputs to the central control unit 501 mismatch information print instruction data (print instructions data) indicating that the label print data could not be normally generated due to a mismatch between the registered processing device information and the managed processing device information (step SE10).

The mismatch information print instruction data is print data compatible with the specifications and settings of the printer 4.

When the printer 4 prints an image on a label R2 based on the mismatch information print instruction data, information indicating that the label print data cannot be correctly generated because the registered processing device information and the managed processing device information do not match is printed on a label R2 as shown in FIG. 8B.

Next, the print data generating unit 503 outputs to the image data generator 502 report data (mismatch report data) indicating that the label print data could not be generated normally because the registered processing device information and the managed processing device information do not match (step SE11). The print data generating unit 503 then ends the print data generating process.

As shown in column (A) of FIG. 7, image data generator 502 receives input of the generation completed report data the print data generating unit 503 output in step SE7, the error report data output in step SE9, or the mismatch report data output in step SE11 and acquires the report data (step SD5).

Next, the image data generator 502 determines if the report data acquired in step SD5 is the generation completed report data (step SD6).

If generation completed report data was received (step SD6: YES), the image data generator 502 ends the print data generating process. In this case, as will be understood below, if there is a generated serial number that has not been processed in the print data generating process, the unprocessed generated serial number is selected for processing.

If the report data is not generation completed report data (step SD6: NO), that is, if the report data received in step SD5 is error report data or mismatch report data, the image data generator 502 executes an appropriate process (step SD7).

For example, the image data generator 502 may control the server display unit 53 to display information indicating that the label print data cannot be correctly generated, and the reason why, on the display panel. This prompts the operator of the print data generating device 2 to determine the cause and take appropriate action.

After completing the process of step SD7, the print data generating unit 503 ends the print data generating process.

As shown in column (A) of FIG. 5, after the print data generating process ends, the central control unit 501 sends to the terminal 3 the label print data the print data generating unit 503 output in step SE6, the error information print instruction data output in step SE8, or the mismatch information print instruction data output in step SE10 (step SA6).

Next, the central control unit 501 determines if the report data the image data generator 502 acquired in step SD5 is generation completed report data (step SA7).

If it is generation completed report data (step SA7: YES), the central control unit 501 determines if there is a generated serial number that has not been processed in the print data generating process (step SA8).

If there is a generated serial number that has not been processed in the print data generating process, (step SA8: YES), the central control unit 501 goes to step SA4 and determines the target serial number.

If all generated serial numbers have been processed (step SA8: NO), the central control unit 501 ends the process.

If in step SA7 the image data generator 502 determines the report data acquired in step SD5 is not generation completed report data, the central control unit 501 aborts the process (step SA9).

Aborting the process in step SA9 has the following effect. That is, if the reason that the label print data could not be correctly generated has not been resolved, step SA9 prevents the print data generating process from continuing. It also prevents sending the same print instructions data (error information print instruction data, mismatch information print instruction data) to the terminal 3 again, unnecessarily printing images based on the print instructions data, reducing processing efficiency and wasting roll paper R.

As shown in column (B) of FIG. 5, the terminal control unit 40 of the terminal 3 receives the label print data, error information print instruction data, or mismatch information print instruction data transmitted by the print data generating device 2 (step SB4).

Next, the terminal control unit 40 sends the label print data, the information print instruction data, or the mismatch information print instruction data to the printer 4 (step SB5).

As shown in column (C) of FIG. 5, the printer control unit 30 of the printer 4 then receives the label print data, the error information print instruction data, or the mismatch information print instruction data sent by the terminal 3 (step SC1).

Next, the printer control unit 30 controls the print unit 31 and prints on a label R2 based on the label print data, error information print instruction data, or mismatch information print instruction data (step SC2). Note that while described in detail, the printer control unit 30 appropriately conveys the roll paper R for printing images on the corresponding label R2.

As a result of step SC2, a label image G1 is printed on the corresponding label R2 when label print data can be normally generated and the print data generating unit 503 generates the label print data. When label print data cannot be generated because an error occurred during the process of generating the label print data, information indicating the reason why is printed on the corresponding label R2 as shown in FIG. 8A. When label print data cannot be generated because the registered processing device information and the managed processing device information do not match, information indicating the reason why is printed on the corresponding label R2 as shown in FIG. 8B.

When label print data based on label image data cannot be generated normally by the print data generating device 2 in this embodiment of the invention, a print data generating unit 503 that runs a, extension program (plug-in) sends print instructions data instructing printing information indicating the reason why through the terminal 3 to the printer 4. Based on the received print instructions data, the printer 4 prints information indicating the reason on a label R2. As a result, by reading the printout from the printer 4, the operator can know that the print data generating device 2 cannot generate label print data and the reason why, and based thereon can take appropriate action.

As described above, the print data generating device 2 has a server control unit 50. The server control unit 50 has an image data generator 502 that acquires a print request, and generates and outputs image data based on the acquired print request; and a print data generating unit 503 that acquires the image data output by the image data generator 502, generates and outputs print data based on the image data when print data can be normally generated based on the acquired image data, and when print data cannot be normally generated based on the acquired image data for a specific reason, generates and outputs print instructions data instructing printing information indicating the specific reason.

Thus comprised, when print data based on the image data cannot be correctly generated by the print data generating unit 503, the print data generating device 2 send the print instructions data to the printer 4 and cause the printer 4 to print information indicating that the print data cannot be generated and why. That print data cannot be generated based on image data can therefore be appropriately reported.

The image data generator 502 in this embodiment outputs registered processing device information (processing device information) including information related to the specifications or settings of the processing device corresponding to the generated image data together with the image data. The print data generating unit 503 manages the specifications or settings of the printer 4, which is the processing device that prints based on the print data when the print data is generated, acquires the image data and registered processing device information output by the image data generator 502, and if print data based on the acquired image data cannot be normally generated because the specifications or settings indicated by the registered processing device information do not match the specifications or settings of the managed printer 4, generates and outputs print instructions data instructing printing information indicating the reason why.

Thus comprised, when the specifications or settings of the processing device registered in the print data generating device 2 do not match the specifications or settings of the printer 4 that actually produces the labels, the print data generating device 2 can detect and report the mismatch.

Thus comprised, when print data based on the acquired image data cannot be correctly generated because an error occurred in the process of generating print data based on the acquired image data, the print data generating unit 503 can generate and output print instructions data instructing printing information indicating the reason why.

Thus comprised, when print data based on the image data cannot be correctly generated because an error occurred in the process of generating print data, the print data generating device 2 can report that print data cannot be generated and why.

When the image data generator 502 in this example acquires a print request requesting continuously printing multiple images, the image data generator 502 generates and outputs image data for one image of the plural images based on the print request.

When print data can be generated based on image data for the acquired single image, the print data generating unit 503 outputs a report that print data was generated to the image data generator 502. When the print data cannot be correctly generated, the print data generating unit 503 reports the same to the image data generator 502. When a report that print data was generated is received, the image data generator 502 generates and outputs image data for the next image following the single image. When a report that print data cannot be generated is received, the image data generator 502 does not generate and output image data for the next image following the single image.

This configuration can prevent the print data generating process continuing to run when the reason why print data cannot be generated has not been remedied. It also prevents sending the same print instructions data (error information print instruction data, mismatch information print instruction data) to the terminal 3 again, and prevents unnecessarily printing images based on the print instructions data, reducing processing efficiency and wasting roll paper R.

The invention is described above with reference to a preferred embodiment thereof, but the invention is not limited thereto and can be modified and adapted in many ways without departing from the scope of the accompanying claims.

For example, the print data generating unit 503 in the foregoing embodiment causes the printer 4 to print information indicating the reason when label print data based on label image data cannot be properly generated. However, a configuration that sends data (which may include print instructions data) for displaying information indicating the reason to the terminal 3 or the printer 4, and displays information indicating the cause, is also conceivable.

For example, in the above example, print data or print instructions data is sent from the print data generating device 2 through the terminal 3 to the printer 4, but a configuration in which the print data generating device 2 transmits directly to the printer 4 is also conceivable. In this configuration, the printer 4 is connected to the network N, and communicates through the network N with the print data generating device 2.

Also in the above example, the print data generating unit 503 sends generation completed report data, error report data, or mismatch report data to the image data generator 502, but a generation completed report data indicating generating print data was successful may be sent regardless of whether or not print data was generated. The label print data, error information print instruction data, or mismatch information print instruction data is still sent through the terminal 3 to the printer 4 and printed in this case. The operator in the factory can therefore know by reading the printout from the printer 4 that label print data cannot be generated by the print data generating device 2, and why.

A system that generates serial number labels is used as an example in the foregoing embodiment, but the invention is not so limited and may be applied in other systems. More specifically the invention can be applied to systems that generate image data in response to a print request, and generate print data based on the generated image data.

The function blocks described above with reference to the accompanying figures also do not suggest a specific hardware configuration.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A print data generating device comprising:
    a memory configured to store registered processing device information, the registered processing device information indicating specifications or settings of processing devices; and
    a controller configured to receive a print request from a terminal and output print data based on the received print request to a processing device;
    wherein the controller acquires a first registered processing device information from the memory, the first registered processing device information indicating the specifications or settings of the processing device;
    generates an image data based on data included in the print request and the first registered processing device information;
    acquires a managed processing device information indicating the specifications or settings of the processing device;
    determines if the first registered processing device information matches the acquired managed processing device information, the processing device being able to print a first print data if the specifications or the settings indicated by the first registered processing device information are applied to the processing device, the first print data being generated by the first registered processing device information and the image data, the image data being compatible with the first registered processing device information;
    generates the first print data based on the image data if the managed processing device information matches the first registered processing device information;
    outputs the first print data to the processing device if generating the first print data has been correctly completed; and
    outputs print instruction data indicating a specific reason why the first print data is not output if
        (i) the managed processing device information does not match the first registered processing device information, or
        (ii) generating the first print data has not been correctly completed.

2. The print data generating device described in claim 1, wherein:
    when the acquired print request requests printing of a first image and a second image continuously, the controller outputs the print data for the first image, and
    if the print data for the first image is correctly generated, the controller generates the image data for the second image, and
    if the print data for the first image is not correctly generated, the controller does not generate the image data for the second image.

3. The print data generating device described in claim 1, wherein the print instruction data indicating at least one of an error information and a mismatch information as the specific reason;
    wherein the error information indicates that the first print data is not output due to an error while generating the first print data; and
    wherein the mismatch information indicating that the first print data is not output due to a mismatch between the managed processing device information and the first registered processing device information.

4. The print data generating device described in claim 3, wherein the print instruction data is compatible with the specifications and settings of the processing device.

5. The print data generating device described in claim 1, wherein the controller configured to receive a print request from a plurality of terminals and output print data to a plurality of processing devices.

6. The print data generating device described in claim 5, wherein generating the first print data is not correctly completed when a work area required to run a process for generating the first print data is not acquired.

7. The print data generating device described in claim 1, wherein the memory stores a plurality of static images
    wherein the controller acquires a first static image from the memory, the first static image being compatible with the first registered processing device information, and
    wherein the image data includes the first static image.

8. A print data generating method, comprising:
    receiving a print request;
    acquiring a first registered processing device information, the first registered processing device information indicating the specifications or settings of a processing device;
    generating an image data based on data included in the print request and the first registered processing device information;
    acquiring a managed processing device information indicating the specifications or settings of the processing device;

determining if the first registered processing device information matches the acquired managed processing device information, the processing device being able to print a first print data if the specifications or the settings indicated by the first registered processing device information are applied to the processing device, the first print data being generated by the first registered processing device information and an image data, the image data being compatible with the first registered processing device information;

generating the first print data based on the image data if the managed processing device information matches the first registered processing device information;

outputting the first print data to the processing device, if generating the first print data has been correctly completed; and outputting print instruction data indicating a specific reason why the first print data is not output if;
  (i) the managed processing device information does not match the registered processing device information, or
  (ii) generating the first print data has not been correctly completed.

9. The print data generating method described in claim 8, wherein the print instruction data comprises one of an error information indicating that the first print data could not be correctly generated due to an error, or mismatch information indicating that the print data could not be correctly generated due to a mismatch between the managed processing device information and the first registered processing device information.

10. The print data generating method described in claim 9,
  wherein the print instruction data is compatible with the specifications and settings of the processing device.

11. A non-transitory computer readable medium encoded with a program executed by a controller, the controller configured to receive a print request and output a first print data based on the received print request to a processing device, wherein the program causes the controller to:

acquire a first registered processing device information indicating the specifications or setting of the processing device;

generate an image data based on data included in the print request and the first registered processing device information;

acquire a managed processing device information indicating the specifications or settings of the processing device;

determine if the first registered processing device information matches the acquired managed processing device information;

generate the first print data based on the image data if the managed processing device information matches the first registered processing device information;

output the first print data to the processing device, if generating the first print data has been correctly completed; and output print instruction data indicating a specific reason why the first print data is not output if;
  (i) the managed processing device information does not match the registered processing device information, or
  (ii) generating the first print data has not been correctly completed.

12. The non-transitory computer-readable medium described in claim 11, wherein the print instruction data comprises one of an error information indicating that the first print data could not be correctly generated due to an error, or mismatch information indicating that the print data could not be correctly generated due to a mismatch between the managed processing device information and the first registered processing device information.

13. The non-transitory computer-readable medium described in claim 12,
  wherein the print instruction data is compatible with the specifications and settings of the processing device.

* * * * *